Aug. 5, 1952     C. E. PARKER     2,605,840
ROTARY SAW ON A TRAVELING CARRIAGE
Filed Sept. 9, 1948     4 Sheets-Sheet 1

INVENTOR.
CLARENCE E. PARKER
BY Hudson, Boughton,
Williams, David & Hoffmann.
ATTORNEYS

INVENTOR.
CLARENCE E. PARKER

INVENTOR.
CLARENCE E. PARKER

Patented Aug. 5, 1952

2,605,840

UNITED STATES PATENT OFFICE 2,605,840

ROTARY SAW ON A TRAVELING CARRIAGE

Clarence E. Parker, Painesville, Ohio, assignor to The Coe Manufacturing Company, Painesville, Ohio, a corporation of Ohio Application September 9, 1948, Serial No. 48,360

9 Claims. (Cl. 164—76)

The present invention relates to apparatus for cutting continuously moving sheet material into lengths and, particularly, wet sheet material, such as, plasterboard, insulation board, and the like.

The principal object of the invention is the provision of a novel and improved cutting apparatus, similar to that shown in R. C. Moore U. S. Patent No. 1,987,409, issued January 8, 1935, entitled "Wet Saw."

Another object of the invention is the provision of a novel and improved apparatus for cutting continuously moving sheet material into lengths, particularly wet sheet material, such as, plasterboard, insulation board, and the like, which apparatus includes a rotatable saw connected to a carrier reciprocable transversely of the material and is simple in construction, reliable in operation, and wherein the saw is pivotally connected to the carrier for movement clear of the material during the return reciprocation or movement of the saw carrier assembly, in such a manner that the inertia of the pivoted assembly helps to raise and lower the same as the movement of the saw carrier assembly is stopped or reversed, thus permitting higher speeds of operation than was heretofore possible.

The invention resides in certain constructions and combinations and arrangements of parts and further objects and advantages thereof will be apparent from the following description of the preferred embodiment described with reference to the accompanying drawings forming a part of this specification, in which similar reference characters designate corresponding parts, and in which Fig. 1 is a fragmentary, plan view of a plasterboard cutting machine embodying the present invention;

The present invention is embodied in an apparatus similar to that shown in the aforesaid Moore Patent No. 1,987,409, and only those parts which are necessary to a complete understanding of the present invention are herein shown and described in detail. The apparatus herein shown is like that shown in said patent except for the construction of the reciprocable assembly which carries the saw proper transversely of the material to be cut, and the elimination of the guide grooves 34 and the track members 45 and 46 from the diagonally extending, supporting beam 25 and operates in a like manner. Reference is made to the patent for a complete disclosure of those parts of the apparatus not herein shown in detail.

Figure 1:
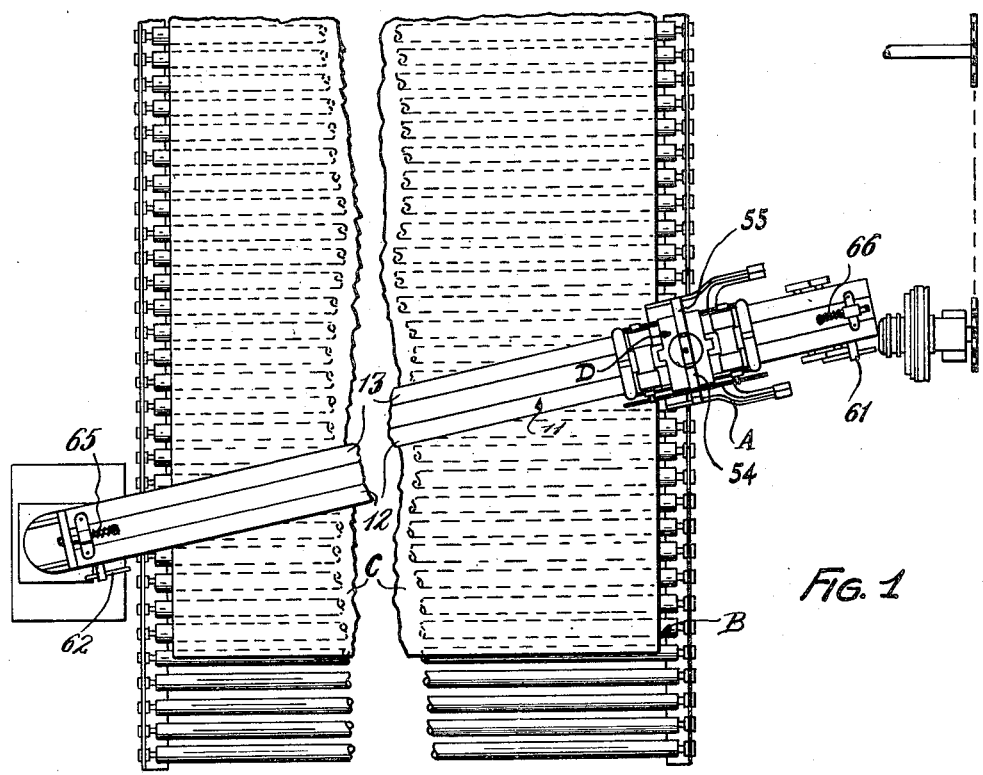
Figure 2:
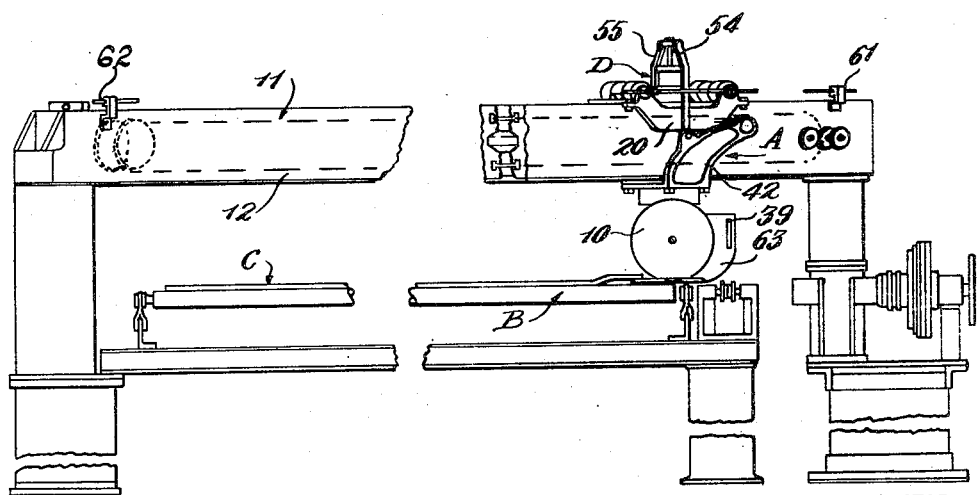
Fig. 2 is an end view of the apparatus shown in Fig. 1, looking from the right.
Figure 3:
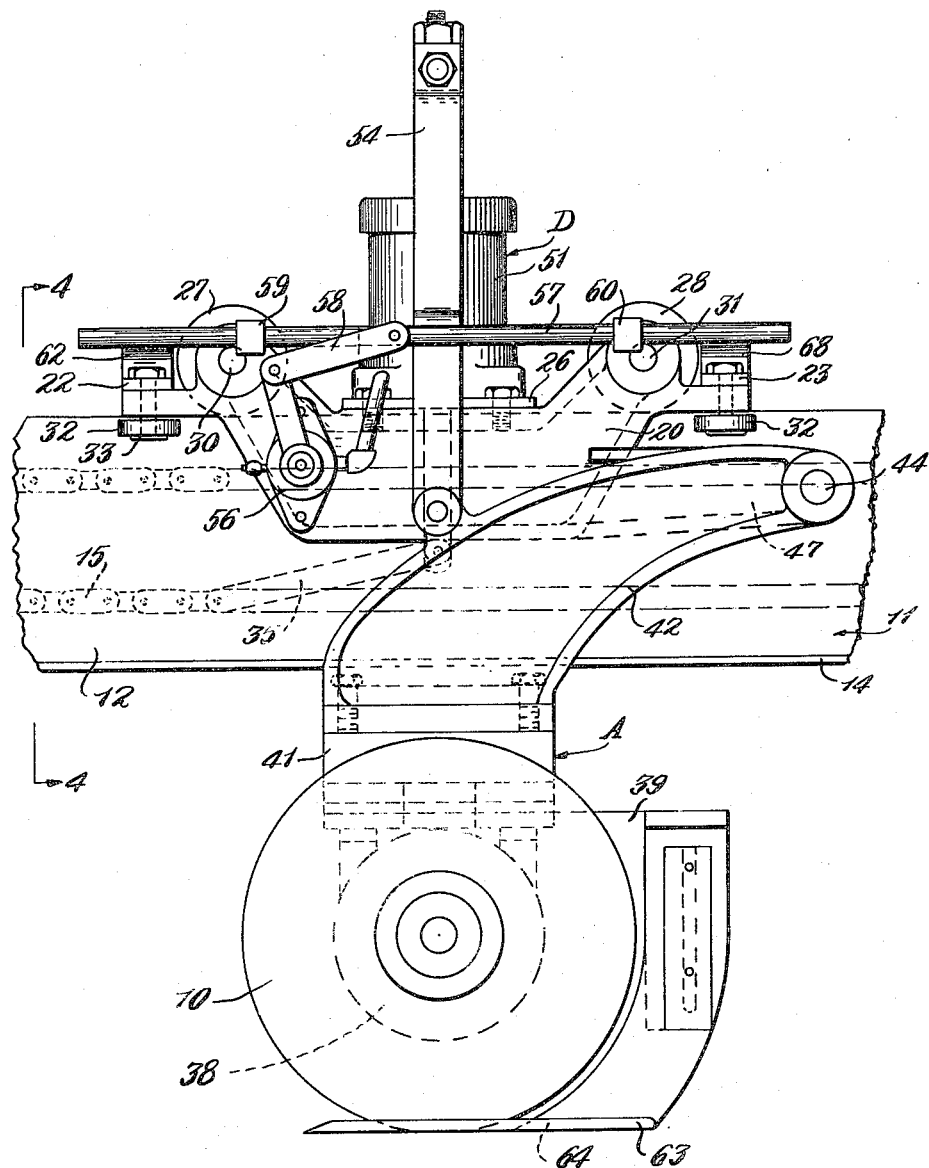
Fig. 3 is a fragmentary, enlarged, elevational view showing the saw carrier assembly.
Figure 4:
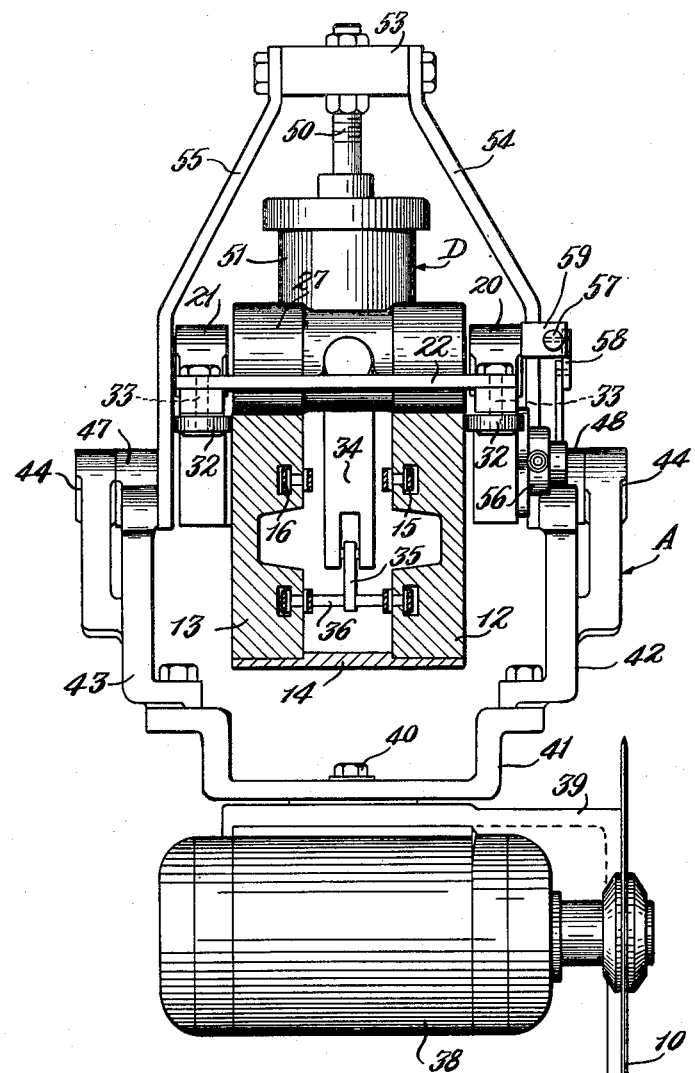
Fig. 4 is a fragmentary, sectional view approximately on the line 4—4 of Fig. 3.
Figure 5:
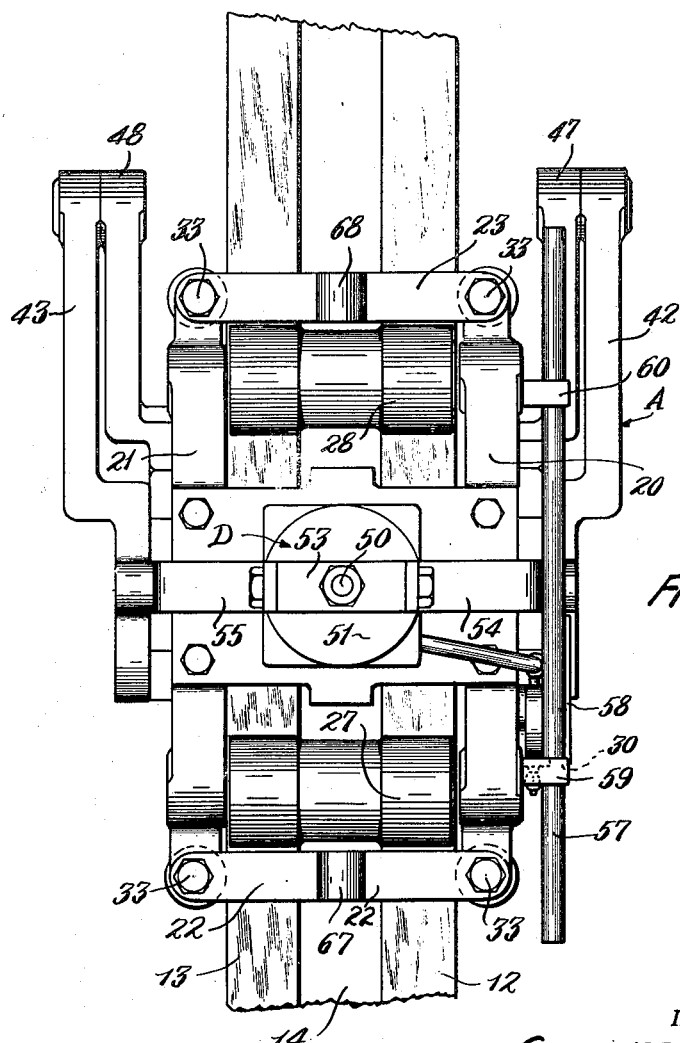
Fig. 5 is a fragmentary, enlarged, plan view showing the saw carrier assembly.

Referring to the drawings, the reference character A designates generally a reciprocable assembly including a rotary saw 10, which assembly is carried by a diagonally extending beam 11 comprising two channel or bar-like members 12 and 13, the undersides of which are connected together by a bottom plate 14. The beam 11 extends across the roller table or conveyor, designated generally as B, and upon which table the continuously moving sheet of wet material C to be cut is carried. The assembly A is adapted to be reciprocated along the beam 11 to cut the material C into lengths by means including sprocket chains 15, 16 extending through the beam and connected to the movable saw carrier assembly. The sprocket chains are driven in timed relation to the movement of the material A, as disclosed in detail in the aforesaid patent, and the beam is inclined with respect to the direction or path of movement of the material C. The construction is such that for each reciprocation or movement of the movable assembly A from right to left, as viewed in Figs. 1 and 2 of the drawings, the material is cut in a line at right angles to its length.

According to the provisions of the present invention, the movable assembly A comprises a carrier frame including side brackets 20, 21, one located at either side of the beam 11. The brackets 20, 21 are connected together above the beam by end members 22, 23 and a center plate 26 bolted to the side brackets. The carrier frame is carried on the beam 11 by rollers 27, 28, one roller being located adjacent to each end of the frame. The rollers are carried by transversely extending shafts 30, 31 fixed to the side brackets 20, 21 and extending therebetween above the beam 11. The rollers ride on the upper edges of the members 12 and 13 of the beam 11. Small rollers or wheels 32, one located at each corner of the carrier frame, carried by the bolts 33 which connect the end members 22, 23 to the side brackets 20, 21 engage the outer sides of the bars 12, 13 and help to guide the carrier frame as it travels along the beam 11. The carrier frame is connected to the chains 15, 16 by a downwardly projecting members 34 bolted to the underside of the plate 26 and a link 35, one end of which is pivotally connected to the lower bifurcated end of the member 34 and the other end to a member 36 connected to and extending between the sprocket chains.

The saw 10 is directly connected to an electric motor 38 bolted to a bracket 39, which bracket is, in turn, bolted by a bolt 40 for adjustment about a vertical axis to a bracket 41 bolted to the free ends of arms 42, 43 located at opposite sides of the beam 11 and to the outside of the brackets 20, 21 of the carrier frame. The opposite ends of the arms 42, 43 are pivoted as by pintle pins 44 to extensions 47, 48 on the brackets 20, 21 projecting a short distance lengthwise of the beam 11 from the brackets proper.

The free ends of the arms 42, 43 are adapted to be raised to lift the saw 10 out of cutting position during the return movement by a fluid pressure motor, designated generally by the reference character D, which motor has an upwardly projecting piston rod 50. The cylinder 51 of the motor is supported upon the transversely extending plate 26 bolted to the upper edges of the brackets 20, 21 and forming a part of the carrier frame. The upper end of the piston rod 50 is adjustably connected to a member 53, which member is, in turn, connected to the arms 42, 43 by links 54, 55, respectively. The flow of fluid pressure to and from the cylinder 51 is controlled by a valve 56 connected to the carrier frame and adapted to be rotated or moved from one position to the other by a slidable rod 57 to which the handle of the valve is connected by a link 58. The rod 57 is slidably supported in suitable bosses 59, 60 on the right-hand bracket member 20 and as the carrier frame approaches opposite ends of the beam 11, the rod is engaged by adjustable stops 61, 62 to reverse the valve and raise or lower the saw, as the case may be.

The movable carrier assembly A also includes a suitable shoe 63 provided with a longitudinally extending slot 64 within which the lower portion of the saw 10 is disposed. The cutting edge of the saw extends below the upper surface of the shoe 63 and the shoe supports the material during the cutting operation. The shoe 63 is connected to the bracket 39 for vertical adjustment, as is the usual case. Fluid pressure may be supplied to the valve 56 and electrical current to the motor 38 in any suitable manner.

In the embodiment shown, the saw cuts as it moves from right to left and during the return reciprocation is held clear of the material C by the pressure fluid motor D. The pivots 44 for the arms 42, 43 are at the right of the saw proper permitting the saw to be moved clear of the material by a relatively small, angular motion of the arms about their pivots. The construction is such that as the movement of the carrier assembly A is stopped or reversed at the left-hand side of the table B, the inertia of the pivoted assembly assists in raising the saw to inoperative position, thus permitting higher speeds of operation than would otherwise be possible with any given machine. In a similar manner, the stopping or reversing of the carrier assembly A at the right-hand side of the table B tends to throw or return the saw to cutting position. Spring-operated bumpers 65, 66 located at opposite ends of the bar 11 and adapted to engage abutments 67, 68 on the end members 22, 23, respectively, assist in stopping and reversing the movement of the saw carrier assembly A at opposite ends of its travel.

From the foregoing description of the preferred embodiment of the invention, it is apparent that the objects heretofore enumerated and others have been accomplished and that there has been provided a novel and improved cutting apparatus for cutting continuously moving sheet material which is simple in construction, light in weight, capable of high speed operation, and which embodies many improvements over the prior art. While the preferred embodiment of the invention has been described in considerable detail, the invention is not limited to the particular construction shown and it is my intention to cover hereby all adaptations, modifications and uses thereof which come within the practice of those skilled in the art to which the invention relates and the scope of the appended claims.

Having thus described my invention, I claim:

1. In cutting apparatus comprising a material supporting table, a beam extending across said table, a frame movably carried by said beam, and means for reciprocating said frame along said beam, the combination of arm means pivotally connected to said frame to swing on an axis extending transversely of the beam, a motor-driven saw connected to said arm means, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, and a fluid pressure operated motor operatively connected to said frame and to said arm means for controlling the movement of said arm means about its pivot whereby said saw is moved into or out of cutting position.

2. In cutting apparatus comprising a material supporting table, a beam extending across said table, a frame movably carried by said beam, and means for reciprocating said frame along said beam, the combination of arm means pivotally connected to said frame to swing on an axis extending transversely of the beam, a motor-driven saw connected to said arm means below the pivotal connection between said frame and said arm means, said arms means and saw comprising an assembly which is unbalanced relative to the pivot of the arm means whereby the inertia of said assembly causes said assembly to tend to rotate in one direction or the other about the pivot of the arm means when said frame is accelerated or decelerated, and a fluid pressure operated motor operatively connected to said frame and to said arm means for controlling the movement of said arm means about its pivot whereby said saw is moved into or out of cutting position.

3. In cutting apparatus comprising a material supporting table, a beam extending across said table, a frame movably carried by said beam, and means for reciprocating said frame along said beam, the combination of arm means pivotally connected to said frame to swing on an axis extending transversely of the beam, a motor-driven saw connected to said arm means, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, a fluid pressure operated motor operatively connected to said frame and to said arm means for controlling the movement of said arm means about its pivot whereby said saw is moved into or out of cutting position, and means for automatically reversing the flow of fluid pressure to said motor at the end of each reciprocation of said frame.

4. In cutting apparatus comprising a table for supporting and continuously moving sheet material to be cut at right angles to its length, a beam located above and extending diagonally across said table, a frame slidably carried by said beams, and means for reciprocating said frame along said beam in cutting and retracting strokes, the combination of arm means pivotally carried by said frame to swing on an axis extending transversely of the beam, a motor-driven saw carried by said arm means and having its center of gravity below the pivot for said arm means and in advance of said axis during the cutting stroke of said frame, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, a member movable with said frame and engageable underneath material to be cut during the cutting operation, and a fluid pressure operated motor operatively connected to said frame and to said arm means for moving said arm means about its pivot to move said saw out of cutting position.

5. In cutting apparatus comprising a table for supporting and continuously moving sheet material to be cut at right angles to its length, a beam located above and extending diagonally across said table, a frame slidably carried by said beam, means for reciprocating said frame along said beam in cutting and retracting strokes, the combination of arm means pivotally carried by said frame to swing on an axis extending transversely of the beam, a motor-driven saw carried by said arm means and having its center of gravity below the pivot for said arm means and in advance of said axis during the cutting stroke of said frame, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, a member movable with said frame and engageable underneath material to be cut during the cutting operation, a fluid pressure operated motor operatively connected to said frame and to said arm means for moving said arm means about its pivot to move said saw out of cutting position, and means for automatically reversing the flow of fluid pressure to said motor at the end of the cutting and retracting strokes.

6. In a cutting apparatus comprising a material supporting table, a beam extending across the table, a frame movable on said beam, and means for reciprocating said frame along said beam, the combination of arm means pivoted to said frame on an axis extending substantially normal to the direction of frame travel, a motor driven saw connected to said arm means and having its center of gravity below the pivot for said arm means, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, and motor means for swinging said arm means on its pivot to raise and lower said saw.

7. In a cutting apparatus comprising a material supporting table, a beam extending across the table, a frame movable along said beam, and means for reciprocating said frame along said beam, the combination of arm means pivoted to said frame on an axis extending substantially normal to the direction of frame travel, a power driven saw connected to said arm means and having its center of gravity below the pivot for said arm means, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, motor means for swinging said arm means on its pivot to raise and lower said saw, and control means for said motor means adapted to actuate said motor means to raise said saw substantially as the travel of said frame is arrested at one end of its movement along said beam, whereby the inertia of said saw tends to raise the saw on said arm means.

8. In a cutting apparatus comprising a material supporting table, a beam extending across the table, a frame movable along said beam, and means for reciprocating said frame along said beam, the combination of arm means pivoted to said frame on an axis extending substantially normal to the direction of frame travel, a motor driven saw connected to said arm means and having its center of gravity below the pivot for said arm means and to one side of a vertical plane through said axis, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, and motor means for swinging said arm means on its pivot to raise and lower said saw.

9. In a cutting apparatus comprising a material supporting table, a beam extending across the table, a frame movable along said beam, and means for reciprocating said frame along said beam in cutting and retracting strokes, the combination of arm means pivoted to said frame on an axis extending substantially normal to the direction of frame travel, a motor driven saw connected to said arm means and having its center of gravity below the pivot for said arm means and in advance of said axis during the cutting stroke of said frame, said arm means and saw comprising an assembly which is unbalanced relative to the pivot of the arm means whereby the inertia of said assembly causes said assembly to tend to rotate in one direction or the other about the pivot of the arm means when said frame is accelerated or decelerated, motor means for swinging said arm means on its pivot to raise and lower said saw, and control means for said motor means adapted to operate said motor means to raise said saw at the time the travel of said frame is checked at the end of the cutting strokes and to lower said saw at the time the travel of said frame is checked at the end of the retracting strokes.

CLARENCE E. PARKER.

REFERENCES CITED

The following references are of record in the file of this patent:

UNITED STATES PATENTS

| Number | Name | Date |
| --- | --- | --- |
| 1,987,409 | Moore | Jan. 8, 1935 |
| 2,295,971 | Savidge | Sept. 15, 1942 |
| 2,387,650 | Davis | Oct. 23, 1945 |
| 2,452,856 | Kerr | Nov. 2, 1948 |